US010184349B2

(12) United States Patent
Schulte

(10) Patent No.: US 10,184,349 B2
(45) Date of Patent: Jan. 22, 2019

(54) APPARATUS HAVING A VACUUM CHAMBER CONFIGURED TO CONVERT ELECTROMAGNETIC WAVES TO ELECTRICITY FOR DRIVING A STEAM GENERATOR SYSTEM

(71) Applicant: David J. Schulte, Harbor Springs, MI (US)

(72) Inventor: David J. Schulte, Harbor Springs, MI (US)

( * ) Notice: Subject to any disclaimer, the term of this patent is extended or adjusted under 35 U.S.C. 154(b) by 0 days.

(21) Appl. No.: 15/196,236

(22) Filed: Jun. 29, 2016

(65) Prior Publication Data

US 2018/0006350 A1 Jan. 4, 2018

(51) Int. Cl.
*F01D 15/10* (2006.01)
*H01P 5/00* (2006.01)
*H02M 7/00* (2006.01)
*H02M 7/04* (2006.01)

(52) U.S. Cl.
CPC ............... *F01D 15/10* (2013.01); *H01P 5/00* (2013.01); *H02M 7/006* (2013.01); *H02M 7/046* (2013.01); *Y10S 74/09* (2013.01)

(58) Field of Classification Search
CPC .......... H02M 1/00; H02M 7/00; H02M 7/006; H02M 7/046; H02M 7/06; F01D 15/10

USPC ..................................... 333/99 MP; 313/104
See application file for complete search history.

(56) References Cited

U.S. PATENT DOCUMENTS

| 3,457,490 | A | * | 7/1969 | Keenan | ................... | H01J 25/76 |
| | | | | | | 307/151 |
| 3,521,146 | A | * | 7/1970 | Forrer | ..................... | H01J 19/80 |
| | | | | | | 307/151 |
| 3,543,135 | A | * | 11/1970 | O'Brien et al. | ........ | H01J 25/76 |
| | | | | | | 307/151 |
| 9,369,057 | B1 | * | 6/2016 | Schulte | ................. | H02M 7/006 |

* cited by examiner

*Primary Examiner* — Benny Lee
(74) *Attorney, Agent, or Firm* — The Weintraub Group, P.L.C.

(57) ABSTRACT

An electricity generator includes a core having a pair of opposing end caps interconnected by a mid-section cooperating to define an interior chamber. In use, the core is held at a vacuum and filled with at least one inert gas. A frequency generator is attached for introducing and inputting electromagnetic waves into the interior chamber. A waveguide tube is provided to connect the frequency generator to the core, allowing for the passage of electromagnetic waves from the frequency generator into the interior chamber. In addition, a plurality of electrodes is provided which extend into the interior chamber to heat the inert gas and conduct the flow of electricity away from a lining on the interior chamber in order to produce steam. The electricity generator further includes at least one external steam generator system for converting the produced steam into energy.

17 Claims, 2 Drawing Sheets

APPARATUS HAVING A VACUUM CHAMBER CONFIGURED TO CONVERT ELECTROMAGNETIC WAVES TO ELECTRICITY FOR DRIVING A STEAM GENERATOR SYSTEM

CROSS-REFERENCE TO RELATED APPLICATION

This application relates to U.S. Pat. No. 9,369,057, filed Mar. 28, 2014 for "Electricity Generator," the entire disclosure of which is hereby incorporated by reference in its entirety including the drawing.

BACKGROUND OF THE INVENTION

1. Field of the Invention

The present invention pertains to an electricity generator. More particularly, the present invention pertains to an electricity generator for generating electricity by introducing electromagnetic waves into a pressurized chamber filled with at least one inert gas.

2. Description of the Prior Art

Various types of electrical generators exist in the prior art which have been used for many years. For example, fossil fuel power plants which burn fossil fuels to generate electricity have been in common use for many years. Examples of such fossil fuels include methane, coal, petroleum, and the like. The power plants that burn such fuels convert combustion products (e.g., heat) into mechanical motion, which is then converted to electricity. However, some of the fuels used by the power plants are obtained by purchase from foreign countries, and national security concerns exist as to the power which this gives to individuals of concern. Also, concerns exist among the public as to the by-products which result from burning these fuels, and there are concerns as to the world's finite supplies of some of these fuels.

In addition, nuclear power has also been used to generate electricity for over fifty years. While the development of nuclear power technology has advanced significantly since catastrophes such as Three Mile Island, such accidents have tainted the public's perception of generating electricity by nuclear power. As a result of the political hurdles that proponents of nuclear energy now face, the world's production of electricity by nuclear power has leveled off since the Chernobyl accident in 1986. In fact, the trend is now to decrease the use of nuclear power on a worldwide scale.

The above mentioned related U.S. Pat. No. 9,369,057 teaches an electricity generator including a plurality of electrodes that heat helium atoms in order to create a plasma. Electrons are then transmitted through the electrodes to an output. While the application teaches the creation of electrons via a plurality of electrodes interacting with helium atoms, there is no teaching of transferring the electrons into a medium in which in a wind turbine or the like can be powered. Furthermore, only a limited number of helium atoms are heated by the electrodes as the helium atoms remain substantially stationary and do not come into contact with the electrodes.

Therefore, there remains a need for an electrical generator which provides means for generating electricity by transforming created electrons into a usable medium in a more productive and efficient manner.

The present invention, as is detailed hereinbelow, seeks to provide such a device for generating electricity.

SUMMARY OF THE INVENTION

According to a first embodiment hereof, the present invention provides an apparatus comprising:

(a) a core having an interior chamber, the interior chamber having a lining, and the interior chamber being held at a vacuum until it becomes filled and pressurized with at least one inert gas;

(b) a waveguide tube having a first end and a second end, the first end being connected to the core and extending to the interior chamber, the waveguide tube comprising a hollow elongated tube;

(c) a frequency generator for generating electromagnetic waves, the frequency generator being connected to the second end of the waveguide, whereby the electromagnetic waves are generated by the frequency generator, pass through the hollow tube of the waveguide, and enter the interior chamber of the core;

(d) a plurality of electrodes extending into the interior chamber, each of the electrodes being electrically connected to an output;

(e) a plurality of diodes, each of the diodes being interposed in electrical communication between a respective electrode and the output for regulating the direction of the flow of electricity; and (f) at least one exterior steam generator system to facilitate the production of energy from the resulting steam by metering out steam against turbine generator blades, a Sterling engine, or modified Sterling engine connected to an electrical generator.

Preferably, the frequency generator is a magnetron.

The core includes a vacuum valve stem and a vacuum pump connected to the vacuum valve stem for creating the vacuum inside the interior chamber. The core further includes an additional valve stem for inputting inert gases into the chamber.

Preferably the electrodes are ribbon-like in shape, such that the width of the electrodes is substantially wider than the thickness of the electrodes. Optionally, the electrodes comprise a metallic material, which can also optionally include tungsten. The electrodes may be coated with a high temperature ceramic coating.

A plurality of hollow resonator tubes is provided which extend into the interior chamber from the core. The resonator tubes have a first end disposed on the core and a second end that extends into the interior chamber. Each resonator tube surrounds a respective electrode. The resonator tubes are preferably formed from glass, Pyrex® glass, quartz, metal, crystal.

The waveguide tube comprises a metallic material. Preferably, the waveguide tube is formed from brass or copper.

The lining along the interior chamber of the core comprises silicone.

For a more complete understanding of the present invention, reference is made to the following detailed description and accompanying drawings. In the drawings, like reference characters refer to like parts throughout the views in which:

DETAILED DESCRIPTION OF THE INVENTION

Figure 1:
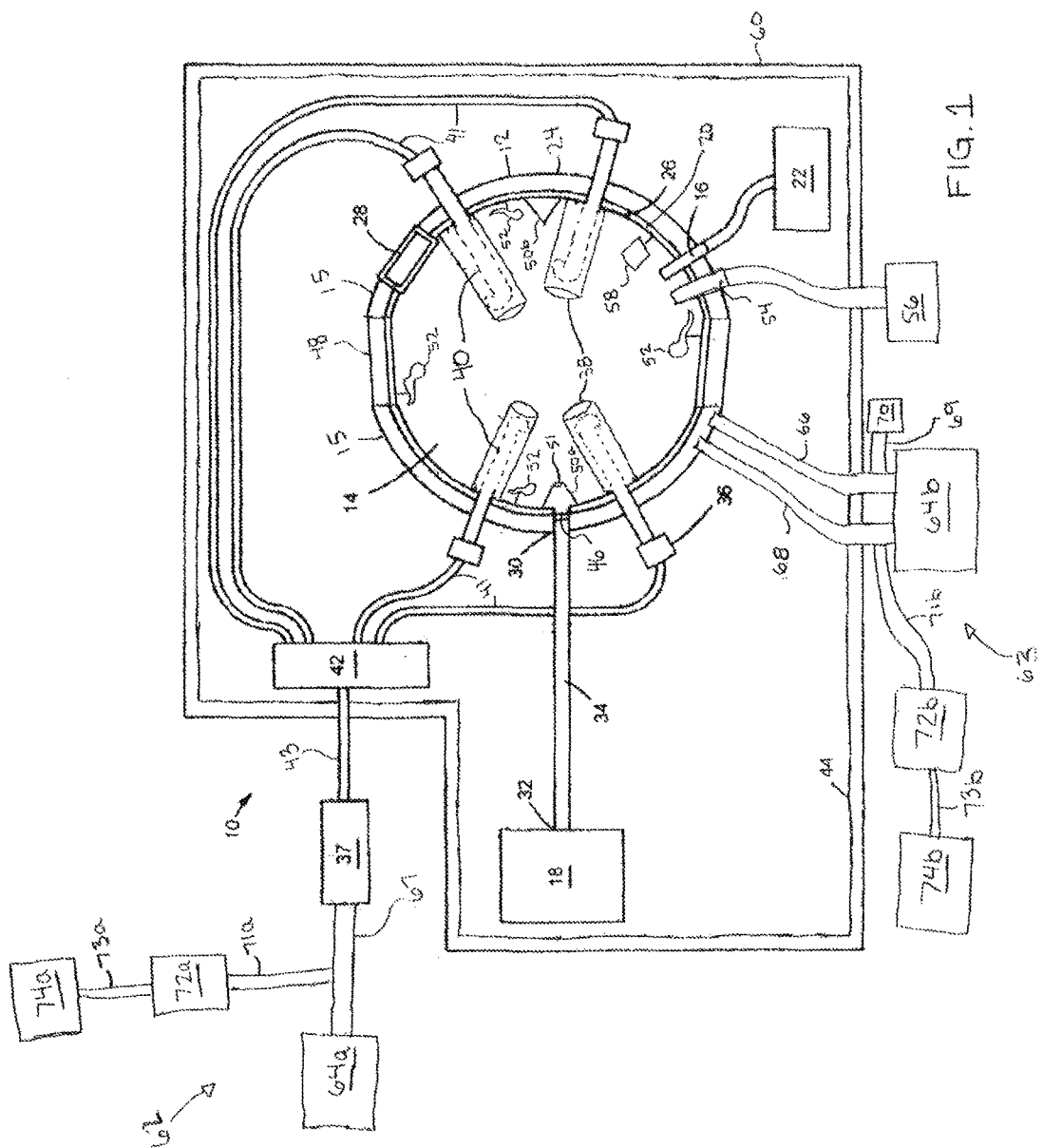
FIG. 1 is a cross-sectional view of a first embodiment of the present invention hereof.

In accordance with a first embodiment of the present invention and as shown generally in FIG. 1, there is provided an electricity generator 10 generally comprising: (a) a core 12 having an interior chamber 14; (b) a hollow point source waveguide tube 34 having a first end 30 that is connected to the core 12 and extending into the interior chamber 14; (c) a frequency generator 18 for generating electromagnetic waves; (d) a plurality of electrodes 40 extending into the interior chamber 14, the electrodes 40 being electrically connected to an output 37; (e) a plurality of diodes 36, each of the diodes 36 being interposed in electrical communication between a respective electrode 40 and the output 37; and (f) and at least one exterior steam generator system 62 for facilitating the production of energy from the resulting steam.

At the outset and used hereinbelow, the term "dial-a-boom" refers to the size of the mid-section 48 having a length that precisely matched a peak-to-peak distance of the wavelength of the chamber driving frequency, i.e., the frequency of the electrons in wave form being pumped into the core from the generator 18.

The core 12 and the interior chamber 14 can be of any shape which is suitable for use herewith, for example, spherical, oval, oblong, square, rectangular, pyramidal, etc. Preferably, the core 12 comprises a three-part assembly wherein outer ends of the core 12 are hemispherical end caps 15 interconnected by a cylindrical "dial-a-boom" mid-section 48.

When the end caps 15 are joined to the mid-section 48, they form a capsule-shaped core 12. Preferably, the end caps 15 each have a diameter of 12-18 inches. Each end cap 15 is affixed to the mid-section 48 with high tensile strength fasteners. Each end cap 15 includes opposing magnetic charges or, alternatively, liquid helium superconducting magnets.

The overall size of the core 12 can be any dimension which is suitable for use with a particular embodiment or required performance output. The length of the "dial-a-boom" mid-section 48 is directly related to the efficiency at which water is allowed to boil. The intended peak-to-peak wavelength of the frequency generator 18, discussed below, is between the range of about 2 to about 3 GHz, which corresponds to the mid-section 48 having a length of approximately 4 inches matching the "peak-to-peak" wavelength distance of 2.4 GHz. Preferably, the frequency generator 18 should produce a frequency of at least 2.4 GHz because of the efficiency at which such frequency causes water to boil. Therefore, the core 12 has an overall diameter of 16-22 inches when the end caps 15 are joined to the dial-a-boom mid-section 48.

The core 12 also includes an exterior 24 defined by the outer surfaces of the combined end caps 15 and mid-section 48. Preferably, the core 12 includes a thick-walled brass chamber proximate the exterior 24. The thin-walled metal chamber of the core 12 provides a water jacket 20 allowing for water to circulate through both the end caps 15 and mid-section 48 and become heated, thereby resulting in the production of steam, as described below. Alternatively, the water jacket 20 may be on the outside of the core 12.

The core 12, including the end caps 15 and mid-section 48, is formed from any suitable material. Preferably, the core 12 is fabricated from a material, such as brass, metal, glass, ceramic, a high-tensile strength plastic (e.g. high-density polyethylene, nylon, acrylonitrile butadiene styrene, polycarbonate, etc.), or the like. The core 12 is a thick-walled chamber in order to contain the driving frequency within.

The core 12 can optionally include a sealed entry 28 for accessing the interior chamber 14. The entry 28 can comprise a hinged locking door which is properly insulated, a removable panel, or any other suitable entry.

The interior chamber 14 maintains a high magnetic charge in order to create a powerful inward vectoring magnetic field to reduce the distance between atoms and overcome the Coulomb Barrier. Such a magnetic field functions to force together and reduce space between inert gas atoms inserted into the interior chamber 14 by an exterior inert gas tank or helium tank 56, described below.

The interior chamber 14 of the core 12 is preferably covered with a lining 26 to facilitate the flow of electrons disposed within the interior chamber 14 by the waveguide tube 34 to the electrodes 40. The lining 26 may have any suitable material which can withstand high temperatures and has IR reflective and/or dielectric properties. The lining 26 optionally comprises a special coating such as a highly polished stainless steel or other mirror-like surface in order to reflect infrared energy from the electrons back towards the center of the chamber 14. In order to be reflective, the interior chamber 14 is highly polished to Grade 6 or higher. The lining 26 can be a capacitive conductor, i.e. the lining 26 can hold an electric charge, and then release that charge to a conductive material once it has reached a supersaturated state. Accordingly, the lining 26 can comprise a material such as a fluoropolymer sold under the trademark Teflon®, which is also known as polytetrafluoro ethylene a polyimide film sold under the trademark Kapton®, or like materials having similar conduction and heat-resistance properties.

The lining 26 can include a conductive or non-conductive material, such as a silicone, graphite, graphene, paint, a thin film, or liquids or oils. Preferably, the lining 26 comprises a silicone material. The lining 26 will give up free electrons and deplete very slowly over time. The lining 26 can also be adhered to the exterior 24 of the core 12. The lining 26 can optionally have RF shielding properties to contain the RF energy inside the interior chamber 14. Furthermore, the lining 26 can have a chemical reaction type lining to effectuate a chemical or nuclear reaction.

As mentioned above, the interior chamber 14 is held at a vacuum to keep oxygen out until it is filled with a highly pressurized inert gas such as Helium 3 or Helium 4 as discussed below. In order to create a vacuum within the interior chamber 14, the core 12 includes a vacuum valve stem 16. A vacuum pump 22 is provided which is connected to the vacuum valve stem 16 for creating the vacuum inside the interior chamber 14 Any suitable type of vacuum pump can be used herewith, including those that are hand-operated or those that are powered by electricity. It is apparent to those having ordinary skill in the art that the type of vacuum pump that is selected will be chosen based upon the size and particular needs for the core 12. Furthermore, the vacuum pump 22 does not need to be used continuously, but only as necessary to vacate all contents and to maintain the vacuum inside the interior chamber 14.

In use, Helium 3 or Helium 4 atoms are inserted into the interior chamber 14 of the core 12 from a helium tank 56 which is highly pressurized at approximately 6,000 psi. Similar to the vacuum valve stem 16, the core 12 also includes an inert gas or helium valve stem 54. The helium tank 56, equipped with a pump, is connected to the helium valve stem 54 for providing helium atoms into the interior chamber 14. The helium tank 56 is only operated as necessary, in order to refill the interior chamber 14 with helium as it becomes depleted during use.

The electricity generator 10 also includes a frequency generator 18 for introducing and inserting electromagnetic waves into the interior chamber 14. The frequency generator 18 is any suitable type of frequency generator known in the art, such as a magnetron, a gyrotron, a klystron, or the like. Preferably, the frequency generator 18 is capable of outputting consistently in a narrow band of radio frequency or microwave frequency electromagnetic wavelength regions. The type of frequency generator used will be dictated, in part, by the size of the electricity generator 10 deployed for any particular application. The frequency generator 18 is attached to the electricity generator 10, via the waveguide tube 34, as described below.

Figure 2:
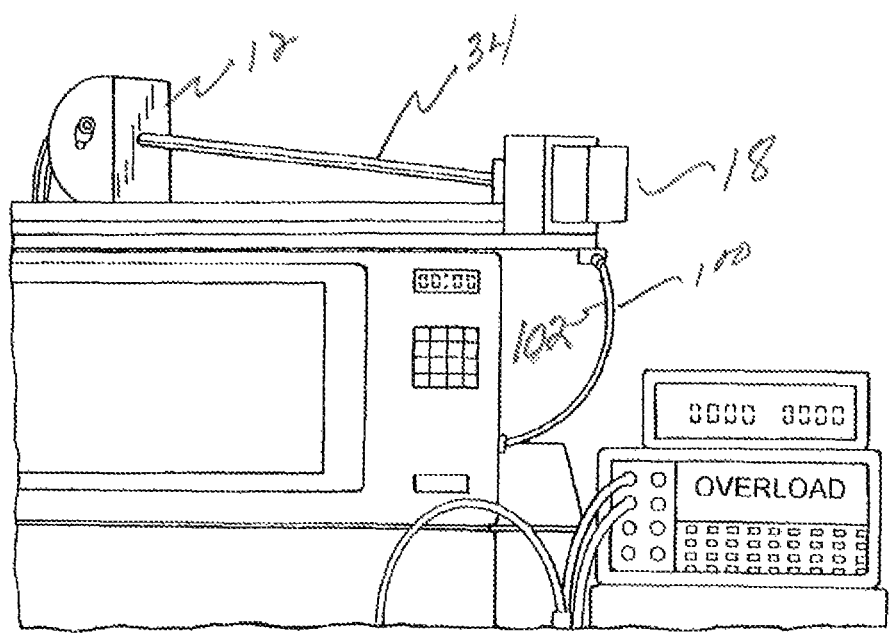
FIG. 2 is an environmental view of the invention in operation, this view includes digital meters that show the wattage into the electricity generator and an overload reading on the output, in which the metered output can measure up to 5,000,000 Watts.

A power source (not shown) for operating the frequency generator 18 is connected thereto by connection wires 100, 102 (FIG. 2). The power source can be a DC battery, an AC outlet, or the like. In addition, the electricity generator 10 itself can provide the power necessary to operate the frequency generator 18, so long as an auxiliary power source (not shown), such as a battery, is provided to initially power the frequency generator 18 until the electricity generator 10 has produced sufficient electricity to become self-operational. The power source can be connected to the frequency generator 18 by an electrical circuit, such as a switch, to allow the frequency generator 18 to be turned on or off.

As shown in FIG. 1, the present invention also includes a waveguide tube 34, or traveling wave tunnel, for directing the extracted RF energy from the frequency generator 18 to the interior chamber 14 of the electricity generator 10. The waveguide tube 34 is a hollow elongated tube which guides a wave, such as an electromagnetic wave. The waveguide tube 34 can be made of a thin-walled metallic or non-metallic material to guide the RF energy from the frequency generator 18 into the interior chamber 14. Suitable examples of such materials are cast brass, copper, bronze, graphene, glass, polymeric materials, ceramics, or composite metal materials. Optionally, the waveguide tube 34 can be plated, such as with chrome. The waveguide tube 34 is tuned for exact dimension based upon the frequency of the RF wavelength emitted. It is preferably circular in cross-section and made from brass.

The waveguide tube 34 can be either a thick heavy-walled cast waveguide or a thin-walled waveguide tube. Thin-walled waveguide tubes can be chosen for their resonant characteristics which may be tuned to effectuate strong standing wave resonant nodes within the waveguide walls itself. A round thin-walled waveguide is ideal. This type of waveguide will amplify the intensity and amplitude of the RF energy exiting the waveguide tube 34 via standing wave resonance phenomenon.

The waveguide tube 34 has a first end 30 and a second end 32. The first end 30 is connected to the core 12 and extends to the interior chamber 14, and the second end 32 is connected to the frequency generator 18. This arrangement allows the electromagnetic waves generated by the frequency generator 18 to pass through the hollow tube of the waveguide tube 34, and then enter the interior chamber 14 of the core 12.

A sealed RF-permeable window 46 is secured to the first end 30 of the waveguide tube 34 where the waveguide tube 34 connects to the core 12. The RF-permeable window 46 can be made from glass or polymeric materials, such as those sold under the trademark Lexan®, which is a polycarbonate resin. The window 46 acts as a vacuum barrier and seals the interior chamber 14. The window 46 also allows the waveguide tube 34 to not be maintained at a vacuum.

The core 12, frequency generator 18, and waveguide tube 34 are hermetically sealed together in order to maintain the vacuum in the interior chamber 14. A plurality of gaskets is provided to ensure that the interior chamber 14 maintains a vacuum. At least one gasket from the plurality of gaskets is provided, as required, between each of the core 12 and the waveguide tube 34, as well as between the waveguide tube 34 and the frequency generator 18. Each of the gaskets in the plurality of gaskets is formed from any suitable type of material known in the art for providing a hermetic seal, such as an elastomer.

A plurality of electrodes 40 is also provided to attract and conduct the free electrons from the lining 26 to the output 37. The plurality of electrodes 40 is in electrical connection with the output 37 by way of a plurality of traveling wave tubes (TWT) or conducting wires 41. The electrodes 40 are preferably formed from a material which is conductive and resistant to high temperatures. The electrodes 40 can be formed from either metallic or non-metallic materials, and in particular, they can be formed from certain metals like tungsten or the like, as well as alloys thereof. The electrodes 40 may also be coated with a high temperature ceramic coating. Furthermore, the plurality of electrodes 40 extends through the end caps 15, not the mid-section 48, of the core 12 and into the interior chamber 14 to attract free electrons. The electrodes 40 extend through the core 12 and into the interior chamber 14 along the end caps 15 at every angle. It is preferred that the number of electrodes extending through the core 12 may be as many as 500.

The electrodes 40 may comprise a variety of different geometries such as being round, square, or planar in shape. Preferably the electrodes 40 are ribbon-like such that the width of the electrodes 40 is substantially wider than the thickness of the electrodes 40. It is also preferred that the electrodes 40 be slightly bent or angled (to a degree of 10° or more) to help create a spring-like tension restoring force when the electrodes 40 are exposed to the electromagnetic waves in the interior chamber 14 of the core 12. This bending creates a spring-like loaded tension that is effectuated by bending the electrodes 40 to cause a spring-like restoring force. The electrodes 40 may be bent to a precise force using a precise microgram strain gauge that reads the spring tension. This allows each electrode 40 to touch the inside and resonate against an associated resonator tube 38, described in greater detail below. Alternatively, a small tubed resonant disc (not shown) may be placed and affixed about the end of the electrodes 40 to create a "standing wave resonance" as they resonate within the associated resonator tube 38. As the electrodes 40 resonate, the ends rapidly become hot and superheat the helium atoms within the interior chamber 14 thus converting the helium atoms in contact with the tips of the electrodes 40 into a superheated, highly energized plasma gas. In the plasma state, the helium atoms result in very high electrical conductivity. Temperatures are hot enough for pure tungsten electrodes to quickly turn white hot and vaporize due to combustion in an oxygen-free air environment Each electrode 40 is hermetically sealed to the core 12 in order to maintain the vacuum in the interior chamber 14. A plurality of gaskets or sealers is provided to ensure that the interior chamber 14 maintains a vacuum.

Each of the electrodes 40 is electrically connected to a high speed one-way diode 36 (located between the electrode 40 and the output 37) for rectifying the electricity as it exits the interior chamber 14 and to prevent back feeding of electricity back into the interior chamber 14. Any suitable type of high speed diode can be used herewith, and it is believed that one having ordinary skill in the art can properly select a suitable diode as required by the output 37 and electrical demands. The diode 36 is preferably a high speed high frequency diode that is a high power, fast-recovery type that can be heatsinked and cooled through which each electrode 40 or electrode group emits its electrical energy through the attached conducting wire 41.

As noted above, there is also provided a plurality of hollow resonator tubes 38. Each of the plurality of resonator tubes 38 has a respective end that extends from the lining 26 towards a substantially central portion of the interior chamber 14. The resonator tubes 38 do not extend into the mid-section 48. Each resonator tube 38 surrounds a respective electrode 40 such that the electrodes 40 resonate against the resonator tube 38 as the electrodes 40 are exposed to the electromagnetic waves within the interior chamber 14. A plurality of electrodes 40 may even be situated within a single resonator tube 38, such that each electrode 40 within the resonator tube 38 has different lengths and resonates against the resonator tube 38 at different locations. The plurality of resonator tubes 38 are preferably formed from materials like ceramic, glass, plastics, metals, Pyrex® glass, Quartz, or the like. Furthermore, each resonator tube may be internally and/or externally lined with a mirror-like finish or ceramic in order to reflect energy back to the center of the interior chamber.

The electrodes 40 conduct electricity to the output 37, such as a high-powered RF antenna, DC battery, a step-up transformer, or any other suitable type of electrical receiver which is used for storing, converting, and/or transmitting electrical current. Preferably, the output 37 is an RF antenna.

A junction box 42 is also provided in electrical connection between the electrodes 40 and the output 37. The junction box 42 is connected to each of the electrodes 40 via the plurality of conducting wires 41 with each of the plurality of conducting wires 41 interconnecting a single electrode 40. The junction box 42 is connected to the output 37 by a single conducting wire 43, similar to that of the conducting wires 41. Any suitable type of junction box can be used, including an oil-filled step down transformer or power line frequency-matching and monitoring electronics.

It is essential that the electrons inserted into the interior chamber 14 by the waveguide tube 34 and the helium atoms inserted by the helium tank 56 are constantly in motion in order to ensure that the electrodes 40 come into contact with as many electrons as possible. For this reason, there are a number of additional, optional fixtures situated within the interior chamber 14 to facilitate the movement of electrons.

One example of such a fixture to move electrons into a vortex pattern is a pair of small metallic pyramids 50a, 50b mounted to the lining 26 of the interior chamber 14 opposite one another to assist in diffracting electrons and mixing the gaseous contents inside the interior chamber 14. Each pyramid 50a, 50b has substantially the same structure, each having a plurality of sides, preferably ranging from 3-10 sides on each pyramid 50a, 50b. More preferably, the pyramids 50a, 50b have only 3 sides, or at least the number of sides is a plurality of 3. While the size of the pyramids can vary, it is preferred that the ratio be 3:2 wherein the base is 3 and the height is 2.

A first pyramid 50a is situated having its base mounted over the RF-permeable window 46 of the waveguide tube 34. The first pyramid 50a includes a hole 51 at the tip, directed toward the center of the interior chamber 14, allowing for electrons to pass through the first pyramid 50a and into the interior chamber 14. A second pyramid 50b, without a hole, is mounted opposite the first pyramid 50a on the lining 26 of the interior chamber 14.

A second type of fixture optionally mounted on the lining 26 of the interior chamber 14 is a metallic harmonic oscillator or cobra snake structure 52. The cobra snake 52 includes a wide head and a long tail interconnected by approximately one to three body curvatures. The cobra snake 52 operates to resonate with respect to the electromagnetic energy that is emitted into the interior chamber 14 via the frequency generator 18 and waveguide tube 34. Where the cobra snake 52 has a wider, heavier mass head, the head will tend to resonate at a frequency slightly lower than the driving frequency. Where the tail is thinner and has a lesser mass, the tail will resonate at a frequency slightly higher than the driving frequency. This causes a fuller and more complete resonance of the contents within the interior chamber 14 and higher overall excitation levels of those contents. The curvature of the cobra snake 52 will slightly wiggle when resonated and this movement tends to gradually stir the contents inside the interior chamber 14 and thereby replenish the plasma on the end of the electrodes 40. The cobra snake 52 is preferably made of metal, such as brass, in order to withstand the conditions within the interior chamber 14. A single "skinny" or thin post is used to secure the cobra snake 52 to the lining 26 of the interior chamber 14 to allow the device to wiggle and resonate. Using a single thin post ensures the amount of resonance is not limited. There is no limit to the number of cobra snakes 52 used, nor their placement within the interior chamber 14. Preferably, four cobra snakes 52 are employed with one mounted proximate each pyramid 50a, 50b.

A fan 58 can be used in order to either facilitate further replenishment of the gases within the interior chamber 14 about the end of the electrodes 40, or assist in evacuating the contents during cleaning. The fan 58 is mounted to the lining 26 of the interior chamber 14 and is in electrical communication with a power source (not shown). The power source can be a DC battery, an AC outlet, or the like. In addition, the electricity generator 10 itself can provide the power necessary to operate the fan 58, similar to the frequency generator 18, so long as an auxiliary power source (not shown), such as a battery, is provided to initially power the fan 58 until the electricity generator 10 has produced sufficient electricity to become self-operational. The power source can be connected to the fan 58 by an electrical circuit, such as a switch, to allow the fan 58 to be turned on or off.

The electricity generator 10 can optionally be provided with means for isolating the electricity generator 10 from external vibration. The means for isolating can comprise a foundation such as a base, table, frame, mount, or plurality of supporting wheels or feet (not shown) which can be supported by springs, shock absorbers, shock-absorbing elastomers such as the type sold under the trademark Sorbothane®, which is a polyurethane of viscoelastic material, or the like. The means for isolating also functions to electrically insulate the core 12 from the ground.

In addition, the electricity generator 10 can optionally be housed in a sealed shielding box 44 to contain stray radio frequency, electromagnetic energies, and fusion alpha particles, and to prevent the collection of electrons out of the airwaves surrounding the electricity generator 10. This will assure that the electricity generator 10 will only be pulling electrons off of the lining 26 of the chamber 14 or from the fused helium atoms. Preferably, the shielding box 44 is a beryllium or metallic bonded box such as those sold under the trademark BoroBond®, which is a ceramic filtering media to trap alpha particles and radiation that escape from the interior chamber 14.

As it is difficult to ensure that all radiation is contained within the shielding box 44, a second encasing box 60 may optionally be placed over the shielding box 44. The encasing box 60 will function to contain any additional radiation that has escaped from the shielding box 44. Preferably, the encasing box 60 is also a beryllium or metallic bonded box, such as those sold under the trademark Boro Bond®, similar to that of the shielding box 44. The encasing box 60 is intended to be disposed every couple years as it becomes radioactive.

Optionally, a timer and pulse circuit (not shown) can be provided to control and regulate the output by turning the frequency generator 18 on and off.

The overall purpose of the electricity generator 10 is to provide an output of steam which can then be directly converted into energy. This conversion is facilitated by the at least one external steam generator system 62 where a first steam generator system 62 is in communication with the output 37 in order to heat water. An optional second steam generator system 63 is in fluid communication with the core 12. The first steam generator system 63 operates to heat water from the electricity generated at the output 37 while second steam generator system 62 operates to facilitate the circulation of water within the core 12.

The first steam generator system 62, generally, comprises a water tank 64a, a steam chamber 72a, and a turbine generator 74a. The water tank 64a includes a valve (not shown), similar to those seen in toilets which refill the toilet when the water drops to a certain level. Water flows out of the water tank 64a and into a water tube 67. The water tube 67 is in communication with the output 37 such that water within the water tube 67 gradually becomes heated. A first steam pressure conduit 71a interconnects the water tube 67 and the steam chamber 72a. Steam produced from the water being superheated is evacuated from the water tube 67 and transferred to the steam chamber 72a via the first steam pressure conduit 71a. The steam chamber 72a acts as a mechanism for gathering steam and building up the requisite pressure prior to releasing the steam into the turbine generator 74a. A second steam pressure conduit 73a interconnects the steam chamber 72a and the turbine generator 74a. Upon accumulating a sufficient amount of steam and reaching the required pressure, the steam is then transferred to the turbine generator 74a via the second stream pressure conduit 73a. At the turbine generator 74a, kinetic energy is extracted from the pressurized steam. As steam turbines are widely used, it is apparent to those having ordinary skill in the art that the type of steam turbine selected will be chosen based upon the size and particular needs, such as a Stirling engine or modified Stirling engine.

The optional second steam generator system 63 provides added efficiency to the electricity generator 10 and functions to cool the core 12 while simultaneously producing steam. The second steam generator system 63 is substantially similar to the first steam generator system 62 with the addition of a water outlet 66 and a water inlet 68 instead of the simple water inlet 67 in the first steam generator system 62. The water outlet 66 transfers water out of a water tank 64b and the water inlet 68 allows water to circulate back into the water tank 64b instead of the simple water inlet 67 in the first steam generator system 62. Furthermore, a water pump 70 includes a pump conduit 69 is in communication with the water outlet 66 in order to generate the flow of water exiting the water tank 64b via the water outlet 66. The water pump 70 either operates on an as needed basis or continuously at a determined speed to efficiently circulate water. The remaining components of the second steam generator system 63 are the same as the first steam generator system 62 having a steam chamber 72b in fluid communication with the water inlet 68 via a first steam pressure conduit 71b and a turbine generator 74b in fluid communication with the steam chamber 72b via a second steam pressure conduit 73b.

It is to be appreciated by one having ordinary skill in the art that the present invention is scalable in size for various applications, as needed. For instance, the present invention can be used to provide electricity in: small-scale applications, such as laptop computers or small household appliances for which portability is desired; medium-scale applications, such as for electric cars or for household-wide electrical production; or large-scale applications, such as providing electricity to entire buildings, or as a power plant producing power for the national power grid.

Preferably, the frequency generator 18 comprises a 2.4 GHz magnetron. A magnetron is a high-powered vacuum tube that generates non-coherent microwaves. A magnetron comprises a hot filament or cathode, which is kept at or pulsed to a high negative potential by a high-voltage, direct-current power supply. The cathode is built into the center of an evacuated, lobed, circular chamber. A magnetic field parallel to the filament is imposed by a permanent magnet. The magnetic field causes the electrons, which are attracted to the positively charged outer portion of the chamber, to spiral outward in a circular path rather than moving directly to the positive anode. Spaced around the rim of the chamber are cylindrical cavities. The cavities are open along their length and connect the common chamber space. As electrons sweep past these openings they induce a resonant, high-frequency radio field in the chamber, which in turn causes the electrons to bunch into groups.

Medium-sized applications require an output from the frequency generator 18 in the range of about 800 Watts to about 2,000 Watts into the interior chamber 14. A very narrow bandwidth RF output from the frequency generator 18 is emitted into the interior chamber 14 via waveguide tube 34.

An electricity generator for medium-sized applications, such as a portable generator or a generator equipped to provide electricity to an entire home or light industrial building can provide an output of about 50,000 Watts to about 500,000 Watts of continuous output.

When the present invention is used for large-scale applications, the frequency generator 18 can, optionally, comprise a gyrotron or a klystron.

A gyrotron is a high-powered vacuum tube which emits millimeter-wave beams by bunching electrons with cyclotron motion in a strong magnetic field. Output frequencies range from about 20 GHz to about 250 GHz, and gyrotrons can be designed for pulsed or continuous operation. A gyrotron is a type of free electron MASER (Microwave Amplification by Stimulated Emission of Radiation). It has high power at millimeter wavelengths because its dimensions can be much larger than the wavelength, unlike conventional vacuum tubes, and it is not dependent on material properties, as are conventional MASER's.

A klystron is a specialized linear-beam vacuum tube. Klystrons are used as amplifiers at microwave and radio frequencies to produce both low-power reference signals for superheterodyne radar receivers and to produce high-power carrier waves for communications. They are the driving force for modern particle accelerators. Klystron amplifiers have the advantage over the magnetron of coherently amplifying a reference signal so its output may be precisely controlled in amplitude, frequency, and phase. Klystrons have an output in the range of 50 megawatts at frequencies nearing 3 GHz. Many klystrons have a waveguide for coupling microwave energy into and out of the device, although it is also quite common for lower power and lower frequency klystrons to use coaxial couplings instead. In some cases, a coupling probe is used to couple the microwave energy from a klystron into a separate external waveguide. Klystrons operate by amplifying RF signals by converting the kinetic energy in a DC electron beam into radio frequency power. A beam of electrons is produced by a thermionic cathode (a heated pellet of low work function material), and accelerated by high voltage electrodes (typically in the tens of kilovolts). This beam is then passed through an input chamber. RF energy is fed into the input chamber at, or near, its natural frequency to produce a voltage which acts on the electron beam. The electric field causes the electrons to bunch because electrons which pass through during an opposing electric field are accelerated while later electrons are slowed, thereby causing the previously continuous electron beam to form bunches at the input frequency. The RF current carried by the beam will produce an RF magnetic field, and this will in turn excite a voltage across the gap of subsequent resident activities. In the output chamber, the developed RF energy is coupled out. The spent electron beam, with reduced energy, is then captured in a collector.

Large-sized applications require an output from the frequency generator 18 in the range of about 1,500 Watts or greater. The frequency generator 18 can emit the RF output directly into the interior chamber 14 via the waveguide tube 34. The frequency generator 18 can also be attached to the core 12 via the waveguide tube 34 to emit the RF output into the core 12. The frequency generator 18 and waveguide tube 34 are hermetically sealed to the core 12.

An electricity generator for large-sized applications, such as for powering industrial buildings, naval or space vessels, or to provide power to a power grid, would provide an output of about 1,500 Watts or more, depending on the volume of the interior chamber 14. Alternatively, a plurality of medium-sized generators could be used in parallel to form a power plant.

In order to ensure that the electricity generator 10 operates at a proper temperature for peak performance and efficiency, means for cooling (not shown) can be provided as well. The means for cooling can be embodied by various structural elements. For instance, in small-scale applications such as in a laptop computer, the means for cooling can comprise the electricity generator 10, including the core 12 and frequency generator 18, being surrounded and embedded within an outer shell, such as a metal "strong box," to maintain both the integrity of the electricity generator 10 and to act as a heatsink. The means for cooling in such small-scale applications can comprise a cast metal "clamshell" type box having a top and a bottom half which are secured together by fasteners, such as screws. A gasket made from a heat conductive material can be secured between the halves of the box. In such an application, the means for cooling can be formed from metals having excellent thermal conductivity properties, such as molybdenum, molybdenum copper, tungsten, tungsten copper, cast iron, aluminum and the like.

In medium-scale applications, the means for cooling can comprise heatsink fins attached directly to the exterior 24 of the core 12. Where used, the fins are formed from a material having a high thermal conductivity, such as metal. Preferably the metal is aluminum, copper, or the like. The fins are affixed to the core 12 by a method which is conducive to the transfer of heat from the core 12 to the means for cooling, such as welding (when appropriate according to material types), fasteners (along with thermally conductive gaskets or grease), and so forth. An automated temperature control system (not shown) can be provided to operate the means for cooling to regulate the temperature of the core 12. The temperature control system can include at least one temperature sensor (e.g., a thermistor, thermocouple, etc.), means for effectuating the flow of a fluid over the fins (e.g., a fan), and a controller (e.g., processor, CPU, etc.) for turning the means for effectuating flow on and off to regulate the temperature of the core 12 within a preferable range.

In large-scale applications, the means for cooling can comprise the core 12 having a system of passageways through which a coolant may flow, such as found in the cooling system for an engine block. A coolant pump for circulating the coolant and means for cooling the coolant can also be provided. An automated system, such as described above, can be provided to ensure that the electricity generator 10 operates within a desired temperature range.

Although various embodiments of the invention have been disclosed for illustrative purposes, it is understood that one skilled in the art can make variations and modifications without departing from the spirit of the invention.

What is claimed is:
1. An electricity generator comprising:
(a) a core including a pair of hemispherical end caps and a mid-section interconnecting the end caps, the end caps and mid-section cooperating to define an interior chamber, the interior chamber having a lining, the core further including a vacuum valve stem and a vacuum pump, the vacuum pump connected to the vacuum valve stem for creating a vacuum inside the interior chamber, the core further including a helium valve stem and a helium pump, the helium pump connected to the helium valve stem for inserting helium into the interior chamber;
(b) a waveguide tube having a first end and a second end, the first end being connected to the core and extending to the interior chamber, the waveguide tube comprising a hollow elongated tube;
(c) a frequency generator for generating electromagnetic waves, the frequency generator being connected to the second end of the waveguide tube, whereby the electromagnetic waves are generated by the frequency generator, pass through the waveguide tube, and enter the interior chamber of the core, the frequency of the waves within the chamber being at a wavelength defining the chamber driving frequency;
(d) a plurality of electrodes extending into the interior chamber, the plurality of electrodes being electrically connected to an output;
(e) a plurality of diodes, each of the diodes being interposed between an associated electrode and the output for regulating the direction of the flow of electricity;
(f) a plurality of hollow resonator tubes, each of the plurality of resonator tubes having a respective end that extends into the interior chamber, and each of the plurality of resonator tubes surrounding a respective electrode;

(g) a first steam generator system, the first steam generator system having a water tube in communication with the output, the first steam generator system further including a steam chamber and a turbine generator, the steam chamber in communication with the water tube via a first steam conduit and the steam chamber in communication with the turbine generator via a second steam conduit;

(h) a pair of opposing pyramids disposed on the interior chamber; and (i) at least one cobra snake structure mounted on the interior chamber.

2. The electricity generator of claim 1 wherein the frequency generator is a magnetron.

3. The electricity generator of claim 1 wherein each of the plurality of electrodes comprises a metallic material.

4. The electricity generator of claim 1 wherein each of the plurality of resonator tubes is formed from glass.

5. The electricity generator of claim 3 wherein each of the plurality of electrodes comprises a tungsten material.

6. The electricity generator of claim 1 wherein each of the plurality of electrodes has a ribbon-like shape, each of the plurality of electrodes having a width that is substantially wider than a thickness of each of the plurality of electrodes.

7. The electricity generator of claim 1 wherein the waveguide tube comprises a metallic material selected from the group consisting essentially of brass and copper.

8. The electricity generator of claim 1 wherein each of the plurality of resonator tubes is formed from a material selected from the group consisting essentially of glass, plastic, ceramic, and metal.

9. The electricity generator of claim 1 wherein the waveguide tube comprises a metallic material.

10. The electricity generator of claim 1 wherein the lining is a material selected from the group consisting essentially of silicone and graphene.

11. The electricity generator of claim 1 including an RF-permeable window secured to the core at the location where the first end of the waveguide tube connects to the core.

12. The electricity generator of claim 1 wherein the mid-section is a dial-a-boom mid-section having a length that matches a peak-to-peak distance of the wavelength of the chamber driving frequency.

13. The electricity generator of claim 1 wherein the at least one cobra snake structures include at least two cobra snake structures mounted to the interior chamber opposite each other on the end caps.

14. The electricity generator of claim 1 further including a fan mounted to the interior chamber for evacuating the interior chamber during cleaning.

15. The electricity generator of claim 1 further including a water jacket disposed proximate the pair of ends caps and mid-section within the interior chamber.

16. The electricity generator of claim 15 further including a second steam generator system, the second steam generator system having a water input and a water output in fluid communication with the water jacket, the water output having a water pump for circulating water out of a water tank and into the water jacket, the second steam generator system further including a steam chamber and a turbine generator, the steam chamber in communication with the water inlet via a first steam conduit and the steam chamber in communication with the turbine generator via a second steam conduit.

17. An electricity generator comprising:

(a) a core including a pair of hemispherical end caps and a mid-section interconnecting the end caps, the end caps and mid-section cooperating to define an interior chamber, the interior chamber having a lining, the core further including a vacuum valve stem and a vacuum pump, the vacuum pump connected to the vacuum valve stem for creating a vacuum inside the interior chamber, the core further including a helium valve stem and a helium pump, the helium pump connected to the helium valve stem for inserting helium into the interior chamber;

(b) a metallic waveguide tube having a first end and a second end, the first end being connected to the core and extending to the interior chamber, the waveguide tube comprising a hollow elongated tube;

(c) a frequency generator for generating electromagnetic waves having a wavelength at a chamber driving frequency, the frequency generator being connected to the second end of the waveguide tube, whereby the electromagnetic waves are generated by the frequency generator, pass through the waveguide tube, and enter the interior chamber of the core, wherein the mid-section has a length that matches a peak-to-peak distance of the wavelength of the chamber driving frequency;

(d) a plurality of metallic electrodes extending into the interior chamber, the plurality of electrodes being electrically connected to an output, the plurality of electrodes being ribbon-like in shape and having a width substantially wider than a thickness thereof;

(e) at least one diode disposed between each of the plurality of electrodes and the output for regulating the direction of the flow of electricity;

(f) a plurality of hollow resonator tubes, each of the plurality of resonator tubes having a respective end that extends into the interior chamber, and each of the plurality of resonator tubes surrounding a respective electrode, each of the plurality of resonator tubes is formed from a material selected from the group consisting essentially of glass, plastic, ceramic, and metal;

(g) a first steam generator system, the first steam generator system having a water tube in communication with the output, the first steam generator system further including a steam chamber and a turbine generator, the steam chamber in communication with the water tube via a first steam conduit and the steam chamber in communication with the turbine generator via a second steam conduit;

(h) a pair of opposing pyramids disposed on the interior chamber;

(i) at least two cobra snake structures mounted on the interior chamber disposed on the end caps and opposite each other;

(j) an RF-permeable window secured to the core at the location where the first end of the waveguide tube connects to the core;

(k) a fan mounted to the interior chamber for evacuating the interior chamber during cleaning;

(l) a water jacket disposed along the perimeter of the core within the interior chamber; and (m) a second steam generator system, the second steam generator system having a water input and a water output in fluid communication with the water jacket, the water output having a water pump for circulating water out of a water tank and into the water jacket, the second steam generator system further including a steam chamber and a turbine generator, the steam chamber in communication with the water inlet via a first steam conduit and the steam chamber in communication with the turbine generator via a second steam conduit.

* * * * *